United States Patent [19]

Cachia

[11] 4,192,530
[45] Mar. 11, 1980

[54] PASSIVE SEAT BELT SYSTEM

[75] Inventor: Joseph M. Cachia, Detroit, Mich.

[73] Assignee: Allied Chemical Corporation, Morris Township, Morris County, N.J.

[21] Appl. No.: 828,450

[22] Filed: Aug. 29, 1977

[51] Int. Cl.² .............................................. B60R 21/02
[52] U.S. Cl. .................................................. 280/802
[58] Field of Search .............. 280/744, 745, 808, 801, 280/807, 806; 297/389, 385

[56] References Cited

U.S. PATENT DOCUMENTS

| 2,639,852 | 5/1953 | Sanders et al. | 297/385 X |
| 3,485,529 | 12/1969 | Marling | 297/385 |
| 3,713,693 | 1/1973 | Cadiou | 297/389 |
| 3,799,577 | 3/1974 | Colucce | 280/150 SB |
| 3,895,822 | 7/1975 | Seiffert et al. | 280/745 |

FOREIGN PATENT DOCUMENTS 2163451  7/1973  Fed. Rep. of Germany .......... 280/745

Primary Examiner—John A. Pekar
Assistant Examiner—Norman L. Stack, Jr.
Attorney, Agent, or Firm—Roger H. Criss

[57] ABSTRACT

A vehicle passive seat belt restraint system including a seat belt adapted to be positioned across and in contact with the torso of a vehicle occupant, the improvement comprising cover means surrounding the seat belt and extending substantially along the entire length of that portion of the seat belt which otherwise would contact the occupant's torso, the seat belt being slideable within the interior of the cover means and the cover means being fixed with respect to said seat belt.

10 Claims, 5 Drawing Figures

U.S. Patent  Mar. 11, 1980  Sheet 2 of 2  4,192,530
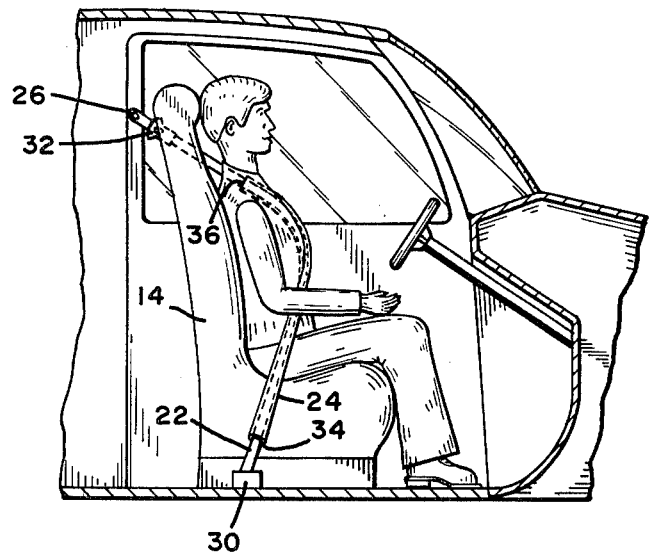
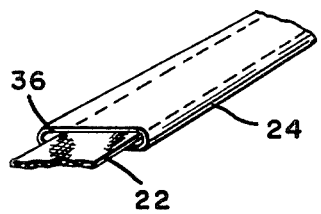
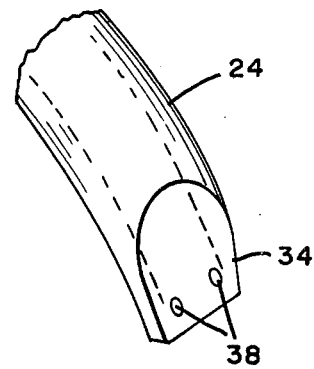

PASSIVE SEAT BELT SYSTEM

BACKGROUND OF THE INVENTION

1. Field of the Invention

This invention relates to passive seat belt systems for vehicles, especially automobiles.

2. Description of the Prior Art

Passive seat belt systems have heretofore been suggested which automatically secure an occupant in his seat, such as upon closing of a vehicle door. Exemplary of such systems are those described in U.S. Pat. Nos. 3,895,822 and 3,897,963 to Seiffert et al. The system disclosed in such patents includes a single diagonal seat belt which is fixed at one end to a portion of the door at a location above the height of and rearward of the occupant's shoulder and has its opposite end attached to a retractor mounted, for example, beneath or to the side of the seat. Upon closing of the door, the seat belt is moved to a position to permit ingress and egress of the occupant. When the door is closed, the belt is moved to a position wherein the occupant is restrained in his seat, with any slack in the belt being taken up by the retractor. The retractor itself typically is of the emergency locking type which permits the belt to be extended and retracted so that the occupant can move freely about in his seat during normal driving conditions, but which locks against further belt extension upon deceleration of the vehicle and/or acceleration of the retractor shaft above a predetermined level.

One problem which is associated with such passive seat belt system is that due to the positioning of the belt on the occupant for purposes of providing a passive system, when the occupant moves forward and rearward in his seat there is considerable rubbing of the belt against the occupant's clothing, especially in the torso area. This so called "seesaw" effect is particularly bothersome to some occupants. It would be desirable if there were provided a passive seat belt system which eliminated or substantially reduced rubbing against the wearer.

SUMMARY OF THE INVENTION

In accordance with this invention, there is provided in a vehicle passive seat belt restraint system including a seat belt adapted to be positioned across and in contact with the torso of the vehicle occupant, the improvement comprising cover means surrounding the seat belt and extending substantially along the entire length of that portion of the seat belt which otherwise would contact the occupant's torso, the seat belt being slideable within the interior of the cover means and the cover means being fixed with respect to the seat belt.

By providing a cover means in accordance with this invention through which the seat belt is slideable, the amount of friction exerted against the occupant's clothing significantly reduced since the sliding belt does not contact the occupant's torso when the belt is extended and retracted during normal movement of the occupant in his seat. Rather, the only portion of the system which is in contact with the occupant's torso is the stationary cover means, which acts as a sheath for the seat belt. The cover means is a flexible hollow element, preferably formed from a low friction material and having an oval shape so as to closely conform to the shape of the seat belt.

BRIEF DESCRIPTION OF THE DRAWINGS

FIG. 3 is a side view similar to FIG. 1 but viewed from the opposite side of the vehicle.

FIG. 4 is a perspective view of the cover means of this invention.

FIG. 5 is a view of the attachment end of the cover means of this invention.

DESCRIPTION OF THE PREFERRED EMBODIMENTS

Figure 1:
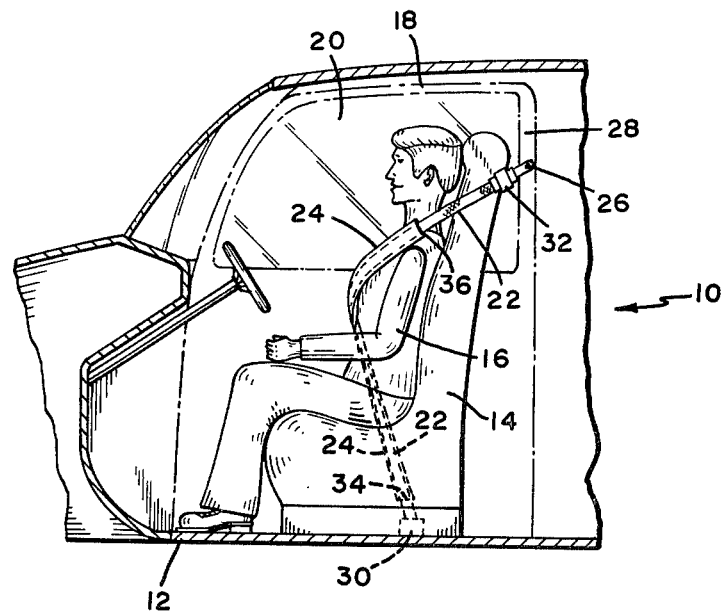
FIG. 1 is a partially cut away side view of the passive seat belt system of this invention with the occupant positioned in his seat.
Figure 2:
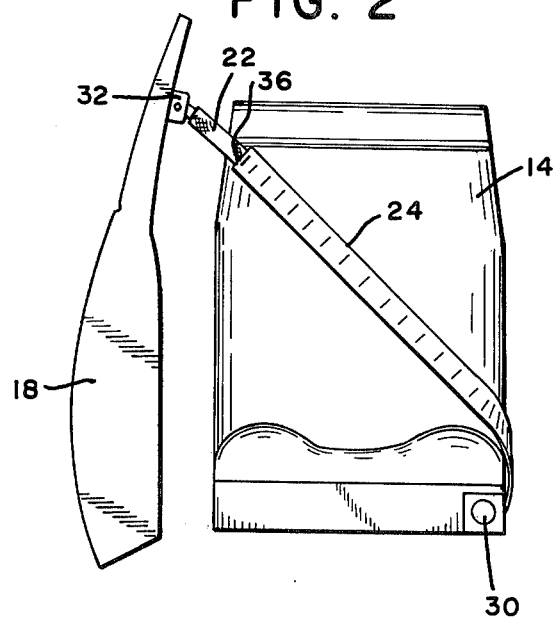
FIG. 2 is a front view of the passive seat belt system of this invention.

With reference to the drawings, there is shown a passive seat belt system, indicated generally at 10, in a vehicle 12, which has a seat 14, door 18 and window 20. Occupant 16 is shown seated in seat 14. Mounted on door frame 28 is mounting 26 to which a seat belt 22 is attached. Seat belt 22, which may be of any suitable webbing material such as nylon or polyester, is attached at its end opposite from mounting 26 to a conventional retractor 30 which may be mounted to the vehicle floor or to the seat 14 or similar location. Retractor 30 preferably is constructed so as to lock seat belt 22 from movement in the extending direction upon a rapid deceleration of the vehicle. Such an emergency locking retractor may be of the vehicle-sensitive or web-sensitive type. However, other types of retractors may also be utilized in the system of this invention. An emergency release buckle 32 may be provided so as to permit emergency egress from the vehicle 12 should retractor 30 be damaged in a collision and be incapable of permiting seat belt 22 from being extended therefrom. Mounting 26 is attached to door frame 28 at a position rearward and above the height of the occupant's shoulder. Seat belt 2 is positioned to restrain occupant 16 against forward motion, with the belt extending diagonally across the occupant's upper torso.

In accordance with this invention, there is provided cover means 24 which surrounds seat belt 22 and through which seat belt 22 slideably passes. One end 34 (FIG. 3) of cover means 24 is fixed with respect to seat belt 22. For example, end 34 of cover means 24 may be affixed to seat 14 by snap connectors 38 or the like (FIG. 5). These connectors may provide a permanent or separable connection of the cover means to the seat. Alternatively, end 34 of cover means 24 may be attached to retractor 30. The opposite end 36 of cover means 24 is located at a position adjacent to the opposite shoulder of the occupant 16 from retractor 30. Thus, cover means 24 extends substantially the entire length of the area of contact with the occupant's torso, which contact would otherwise be made by seat belt 22.

Cover means 24 is in the form of a sheath and preferably has a generally oval shape so as to closely conform to the rectangular shape of the seat belt and permit the seat belt to freely pass through its interior space. Cover means 24 is formed of a flexible material which preferably has a low friction outer surface for contact with the occupant's body and clothing. Examples of such suitable materials include plastic materials such as those formed from nylon, polyethylene, polypropylene, acetate and the like, rubber, hollow fabrics and the like.

By providing seat belt 22 as slideable within sleeve 24 in the area of the occupant's torso, the seesaw effect of rubbing of the moving belt against the occupant's clothing is eliminated since the only contact with the occupant is with the stationary sleeve 24. Sleeve 24 is preferably flexible so as to permit the occupant to freely move thereagainst and to bend with the opening and closing of the door.

The passive seat belt system depicted in the drawings is door-activated. That is, upon opening of the vehicle door, seat belt 22 is extended from retractor 30 and moved with cover means 24 towards a forward position so as to permit easy access to the vehicle seat. Once the occupant is seated and the door closed, the belt is automatically positioned around the occupant. It should be pointed out, however, that the cover means of this invention is useful with other types of passive seat belt-activated systems, such as those including electrical motors which are activated upon seat occupancy or ignition start-up, as well as with combined shoulder and lap belt systems.

It has heretofore been suggested in U.S. Pat. No. 3,799,577 to Colucci to provide a sheath for a seat belt that is used around the pelvic region of the occupant (i.e., the lap belt), in order to prevent rubbing of the occupant's clothes. However, such a lap belt is not subjected to the degree of movement which is associated with the upper torso of an occupant as he moves against a shoulder harness with similar restraint. Moreover, the sheath of the Colucci patent is not stationary with respect to the belt and is subject to possible jamming in the mechanism depicted or to undesired motion against the occupant's clothes. Although a sheath is also shown in such patent as partially covering a diagonal belt, its purpose is to be comparatively rigid so as to hold the belt away from the occupant's head when the seat belt is positioned around the occupant.

It is to be understood that variations and modifications of the present invention may be made without departing from the scope thereof. It is also to be understood that the present invention is not to be limited by the specific embodiments disclosed herein but only in accordance with appended claims when read in light of the foregoing specification.

I claim:

1. In a vehicle passive seat belt restraint system including a seat belt adapted to be positioned across and in contact with the torso of the vehicle occupant, the improvement comprising cover means surrounding said seat belt and extending substantially along the entire length of that portion of said seat belt which otherwise would contact the occupant's torso, said seat belt being slideable within the interior of said cover means and said cover means being fixed at one end to a part of said vehicle, whereby the position of said cover means is fixed with respect to said occupant.

2. The passive seat belt restraint system of claim 1 wherein said seat belt has a first end attached to a first portion of said vehicle at a location above the height of and rearward of an occupant's shoulder and adjacent to one side of the occupant's seat and a second end attached to a second portion of said vehicle on the side of said seat opposite said one side and below the height of said first portion so as to position said seat belt across the torso of said occupant to restrain him from movement in the event of a sudden deceleration of the vehicle.

3. The passive seat belt restraint system of claim 2 wherein said cover means comprises a hollow sheath formed of a flexible material.

4. The passive seat belt restraint system of claim 3 wherein one end of said sheath is attached to an associated vehicle seat.

5. The passive seat belt restraint system of claim 3 wherein said cover means is in the form of a plastic sleeve.

6. The passive seat belt restraint system of claim 3 wherein said cover means has a substantially oval-shaped cross section.

7. The passive seat belt restraint system of claim 1 including an emergency release buckle for releasing said seat belt from a position around the occupant.

8. The passive seat belt restraint system of claim 1 wherein including an emergency locking seat belt retractor to which one end of said seat belt is attached, said seat belt being extendable and retractable from and to said retractor when said occupant is seated in a seat in said vehicle.

9. The passive seat belt restraint system of claim 2 wherein said first portion of said vehicle comprises a portion of a door frame and said second end of said seat belt is attached to said second portion of said vehicle through a seat belt retractor.

10. The passive seat belt restraint system of claim 9 wherein said one end of said cover means is attached to said retractor.

* * * * *